United States Patent [19]

Shimpuku et al.

[11] Patent Number: 5,745,582
[45] Date of Patent: Apr. 28, 1998

[54] AUDIO SIGNAL TRANSMITTING APPARATUS AUDIO SIGNAL RECEIVING APPARATUS AND AUDIO SIGNAL TRANSMITTING AND RECEIVING SYSTEM

[75] Inventors: Yoshihide Shimpuku, Kanagawa; Yasuyuki Chaki; Norihito Mihota, both of Chiba; Takatsuna Sasaki, Tokyo, all of Japan

[73] Assignee: Sony Corporation, Tokyo, Japan

[21] Appl. No.: 614,493

[22] Filed: Mar. 13, 1996

[30] Foreign Application Priority Data

Mar. 16, 1995 [JP] Japan .................... 7-057669

[51] Int. Cl.$^6$ .................................. H04B 3/00
[52] U.S. Cl. ................ 381/77; 381/105; 359/145; 455/355
[58] Field of Search ................ 381/105, 104, 381/102, 2, 77, 80, 81, 82, 84, 85; 359/145, 149; 375/260, 281, 284, 296, 308, 332, 346, 217, 216; 455/200.1, 355, 68; 370/522, 527

[56] References Cited

U.S. PATENT DOCUMENTS

| | | | |
|---|---|---|---|
| 4,621,374 | 11/1986 | Micic et al. | 381/105 |
| 4,882,725 | 11/1989 | Noda et al. | 370/206 |
| 5,220,430 | 6/1993 | Han | 348/738 |
| 5,532,556 | 7/1996 | Anderson et al. | 381/2 |

*Primary Examiner*—Curtis Kuntz
*Assistant Examiner*—Ping W. Lee
*Attorney, Agent, or Firm*—Limbach & Limbach L.L.P.

[57] ABSTRACT

An audio signal transmitting apparatus including, an audio transmission signal generating unit for adding an error correction signal to a digital audio signal and encoding and interleaving the result to generate an audio transmission signal; a continuous signal generating unit which generates a continuous signal by repeating the digital control signal to be used for the reproduction of the digital audio transmission signal a predetermined number of times; a multiplexing unit for multiplexing the audio transmission signal and the continuous signal to generate a multiplexed signal; a modulated signal generating unit for modulating the multiplexed signal by a predetermined digital modulation method to generate a modulated signal within a predetermined frequency band; and an optical signal transmitting unit for converting the modulated signal to an optical transmission signal and transmitting the same. Also, an audio signal receiving apparatus for reproducing a digital audio signal and a digital control signal from an optical transmission signal generated by the audio signal transmitting apparatus and an audio signal transmitting and receiving system using the same.

12 Claims, 9 Drawing Sheets

AUDIO SIGNAL TRANSMITTING APPARATUS AUDIO SIGNAL RECEIVING APPARATUS AND AUDIO SIGNAL TRANSMITTING AND RECEIVING SYSTEM

BACKGROUND OF THE INVENTION

1. Field of the Invention

The present invention relates to an audio signal transmitting apparatus, an audio signal receiving apparatus, and an audio signal transmitting and receiving system used for the transmission of a digital audio signal and a digital control signal used for the control of audio equipment.

2. Description of the Related Art

In the past, use has been made of an audio signal transmitting and receiving system of an analog format which frequency-modulates infrared rays by an analog audio signal to generate a transmission signal and transmits the same through space. The analog format audio signal transmitting and receiving system is used for example for the transmission of an audio signal from a CD player to a speaker.

In the analog format audio signal transmitting and receiving system, however, since the infrared rays are modulated in frequency by the analog audio signal, there is a problem that the quality of the sound is apt to deteriorate during the transmission etc. Further, in the analog format audio signal transmitting and receiving system, it is difficult to carry the analog format audio signal and the digital format control signal for adjusting the quality of sound among components of the audio system in the same transmission signal, so it is necessary to separately transmit the audio signal and the control signal.

SUMMARY OF THE INVENTION

The present invention was made to overcome the above disadvantage of the related art and has as an object thereof to provide an audio signal transmitting apparatus, an audio signal receiving apparatus, and an audio signal transmitting and receiving system which can perform optical transmission of a digital format audio signal with small deterioration of the sound quality over the transmission path.

Further, another object of the present invention is to provide an audio signal transmitting apparatus, an audio signal receiving apparatus, and an audio signal transmitting and receiving system which can transmit an audio signal and a control signal used for the control of the sound quality thereof carried in the same transmission signal.

So as to achieve the above object, according to a first aspect of the present invention, there is provided an audio signal transmitting apparatus including an audio transmission signal generating means for adding an error correction signal to a digital audio signal and encoding and interleaving the result to generate an audio transmission signal; a continuous signal generating means which generates a continuous signal by repeating the digital control signal to be used for the reproduction of the digital audio transmission signal a predetermined number of times; a multiplexing means for multiplexing the audio transmission signal and the continuous signal to generate a multiplexed signal; a modulated signal generating means for modulating the multiplexed signal by a predetermined digital modulation method to generate a modulated signal within a predetermined frequency band; and an optical signal transmitting means for converting the modulated signal to an optical transmission signal and transmitting the same.

Preferably, the modulated signal generating means modulates the multiplexed signal by a differential type QPSK modulation method of a roll-off ratio of 50% or less to generate the modulated signal.

According to a second aspect of the present invention, there is provided an audio signal receiving apparatus for reproducing a digital audio signal and a digital control signal from an optical transmission signal generated by the audio signal transmitting apparatus according to the first aspect of the present invention, including a reception means for converting the optical transmission signal to an electric reception signal; a multiplexed signal reproducing means for demodulating the reception signal by a digital demodulation method corresponding to the predetermined digital modulation method to reproduce the multiplexed signal; a separating means for separating the audio transmission signal and the continuous signal from the multiplexed signal; a digital audio signal reproducing means for deinterleaving the audio transmission signal separated by the separating means, decodes the same, and performs error correction based on the added error correction signal to reproduce the digital audio signal; and a digital control signal reproducing means for judging the continuous signal by a majority decision to reproduce the digital control signal.

According to a third aspect of the present invention, there is provided an audio signal transmitting and receiving system including an audio signal transmitting apparatus and audio signal receiving apparatus of the above first and second aspects of the invention.

BRIEF DESCRIPTION OF THE DRAWINGS

These and other objects and features of the present invention will become more apparent from the following description of the preferred embodiments of the invention made with reference to the accompanying drawings, wherein.

DESCRIPTION OF THE PREFERRED EMBODIMENTS

The configuration of an audio signal transmitting and receiving system will be explained first.

Figure 1:
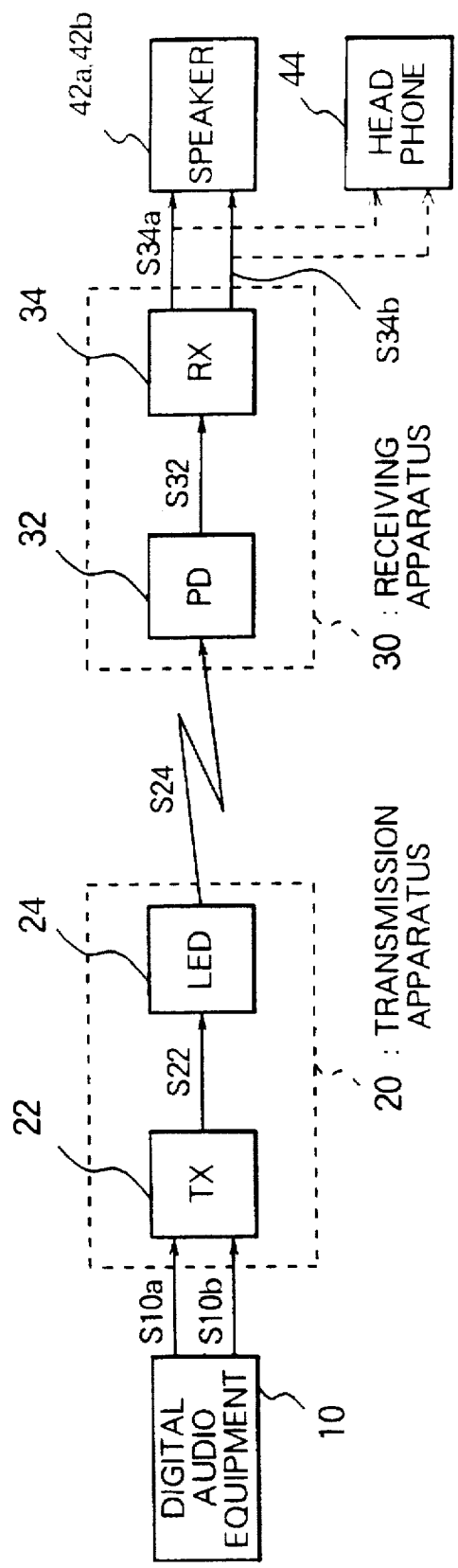
FIG. 1 is a view of the configuration of an audio signal transmitting apparatus according to the present invention.
Figure 2:
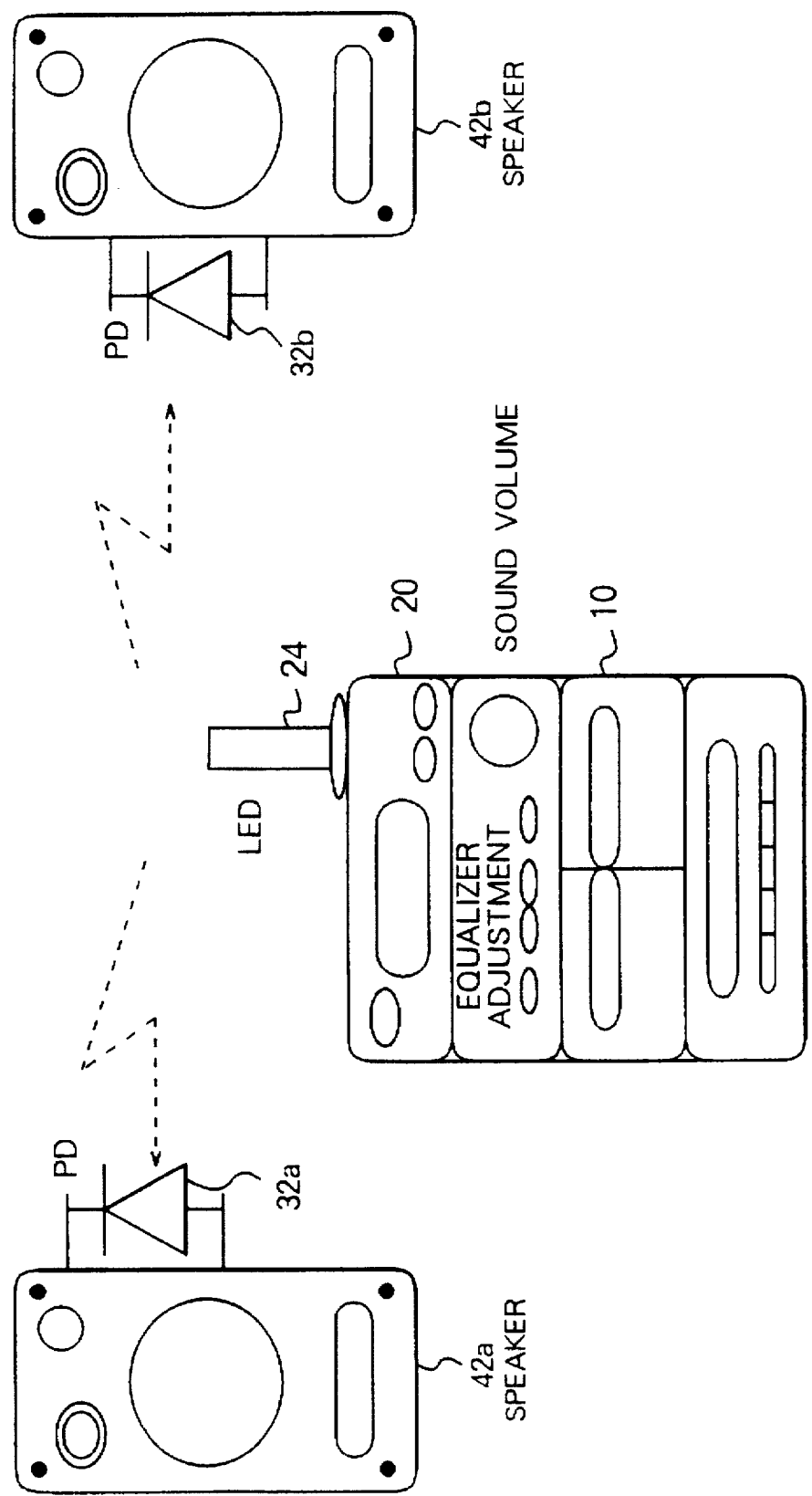
FIG. 2 is a view of a mode of use of the audio signal transmitting apparatus shown in FIG. 1.

FIG. 1 is a view of the configuration of the audio signal transmitting and receiving system according to the present invention, while FIG. 2 is a view of a mode of use of the system.

As shown in FIG. 1 and FIG. 2, the audio signal transmitting and receiving system 1 is constituted by a digital audio equipment (DAE) 10, a transmitting apparatus 20, a receiving apparatus 30, and speaker systems (SP) 42a and 42b or a headphone system (HP) 44. The transmitting apparatus 20 is constituted by a transmission circuit (TX) 22 and a light emitting diode (LED) 24, while the receiving apparatus 30 is constituted by a photodiode (PD) 32 and a reception circuit 34.

The digital audio equipment 10 takes the form for example of a mini-component. In the processing for reproducing an analog format audio signal from a digital audio signal S10a reproduced from a compact disc (CD) etc. and the digital audio signal in the speaker systems 42a and 42b, it outputs a control signal S10b of a digital format to be used for the processing for the adjustment of the quality and volume of the audio signal etc. to the transmitting apparatus 20. Note that, the digital audio signal S10a output from the digital audio equipment 10 to the transmitting apparatus 20 has a sampling frequency of 44.1 kHz and 16 bits and has the same format as that of the signal recorded on the compact disc.

In the transmitting apparatus 20, the transmission circuit 22 adds an error correction code to the digital audio signal S10a, performs coding by for example Reed-Solomon coding, and further performs interleaving to generate the audio transmission signal, obtains a continuous signal by repeating the control signal a predetermined number of times, multiplexes these signals and modulates the same to generate a modulated signal, and outputs the result to the light emitting diode 24. Note that the configuration and operation of the transmission circuit 22 will be explained later referring to FIG. 3. The light emitting diode 24 is a light emission diode of for example the infrared region, converts the modulated signal input from the transmission circuit 22 to an optical transmission signal (S24), and transmits the same to the receiving apparatus 30.

In the receiving apparatus 30, the photodiode 32 converts the transmission signal S24 spatially transmitted from the light emitting diode 24 to an electric reception signal and outputs the same to the reception circuit 34. The reception circuit 34 demodulates the reception signal S32, deinterleaves it, and decodes it by Reed-Solomon decoding, and performs error correction to reproduce the original digital audio signal, performs error correction by majority decision with respect to the control signal, and outputs the resultant signal to the speaker systems 42a and 42b. Note that, the configuration and operation of the reception circuit 34 will be explained later referring to FIG. 6.

Figure 3:
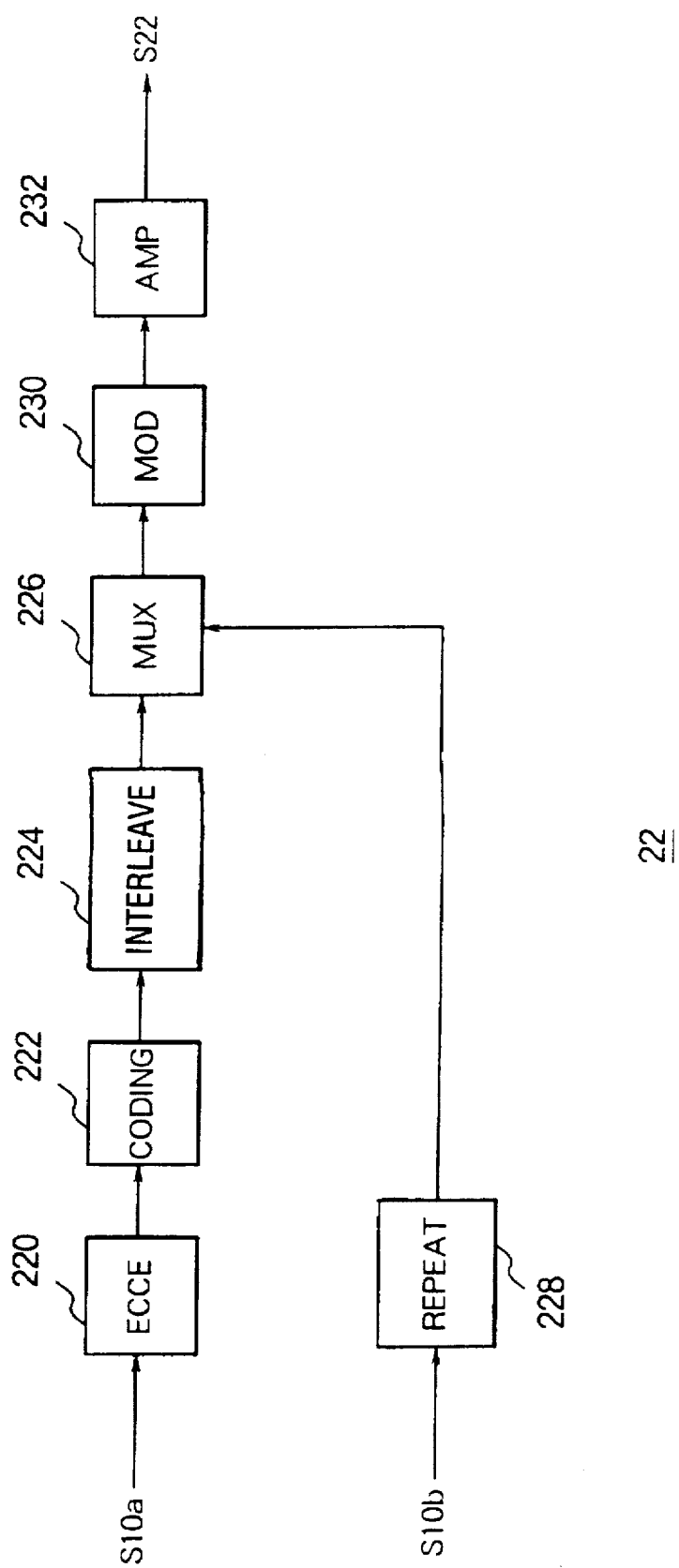
FIG. 3 is a view of the configuration of a transmission circuit shown in FIG. 1.

FIG. 3 is a view of the configuration of the transmission circuit 22 shown in FIG. 1.

The transmission circuit 22 is constituted by an error correction code addition circuit (ECCE) 220, a coding circuit 222, an interleave circuit 224, a multiplexing circuit 226, a modulation circuit 230, a repetition circuit 228, and an amplification circuit 232.

The error correction code addition circuit 220 generates an error correction code based on the digital audio signal S10a, inserts it at a predetermined position of the digital audio signal S10a, and outputs the result to the coding circuit 222.

The coding circuit 222 encodes the signal input from the error correction code addition circuit 220 by for example Reed-Solomon coding and outputs the resultant signal to the interleave circuit 224.

The interleave circuit 224 interleaves the signal input from the coding circuit 222 to generate an audio transmission signal and outputs the same to the multiplexing circuit 226.

The repetition circuit 228 repeats the control signal input from the digital audio equipment 10 a predetermined number of times, for example, eight times, to generate a continuous signal and outputs the same to the multiplexing circuit 226.

The multiplexing circuit 226 multiplexes the audio transmission signal and the continuous signal to generate a multiplexed signal and outputs the same to the modulation circuit 230.

The modulation circuit 230 modulates the multiplexed signal by a differential type QPSK modulation method of a roll-off ratio of for example 50% or less so that it is adapted to the CP-1205 standard of the Electronic Industries Association of Japan to generate a modulated signal within the frequency band of 3 MHz or less and outputs the same to the amplification circuit 232. Note that, the modulation method of the CP-1205 standard of the Electronic Industries Association of Japan and the modulation circuit 230 will be further explained by referring to FIG. 4, FIG. 5, and FIG. 6.

The amplification circuit 232 amplifies the modulated signal and outputs the result to the light emitting diode 24.

Figure 4:
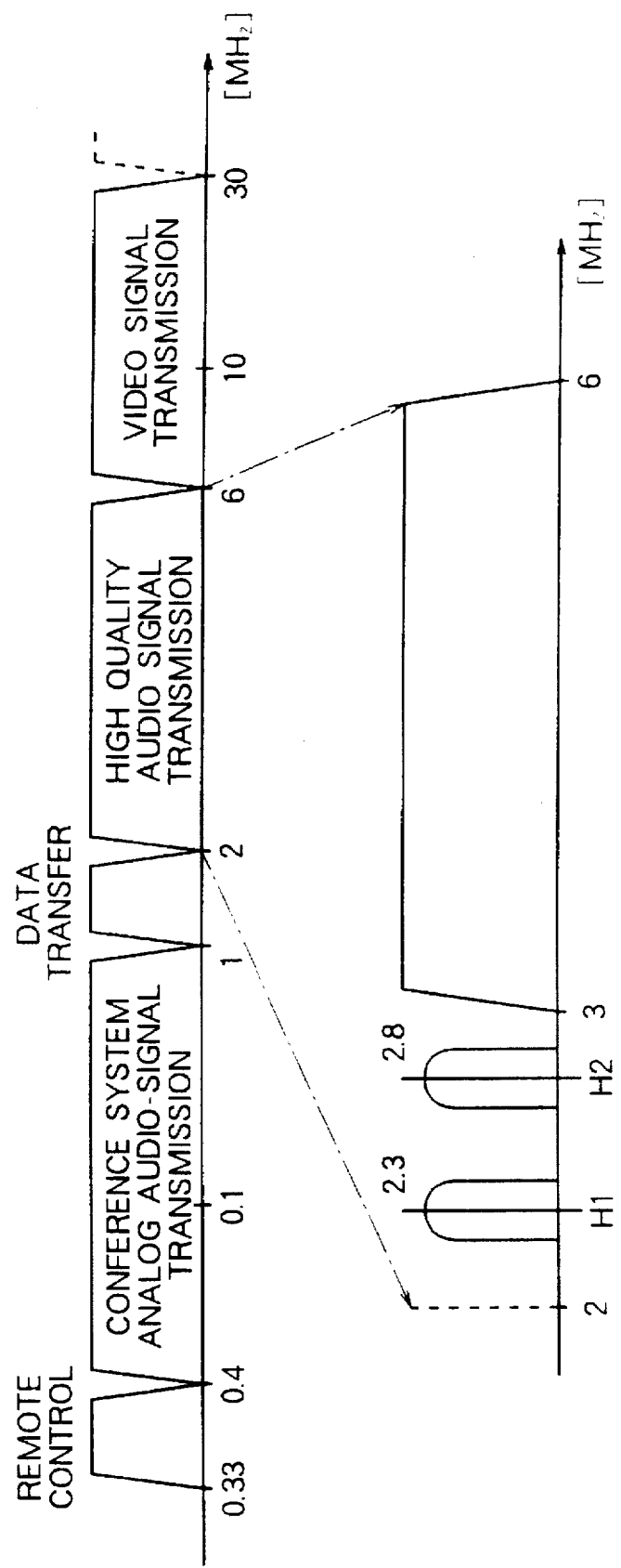
FIG. 4 is a view explaining the CP-1205 standard of the Electronics Industries Association of Japan used when optically transmitting an audio signal etc.
Figure 5:
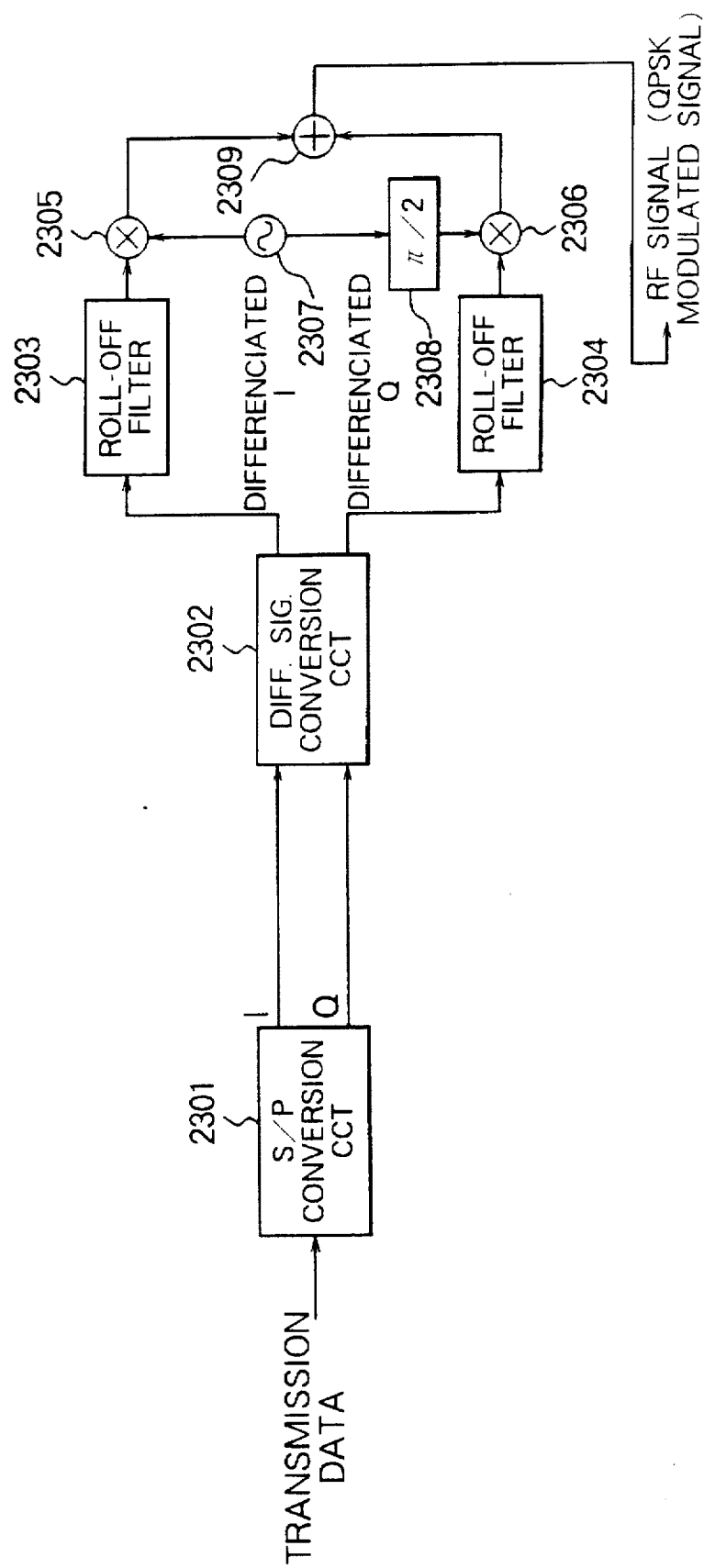
FIG. 5 is a view of the configuration of a modulation circuit.
Figure 6:
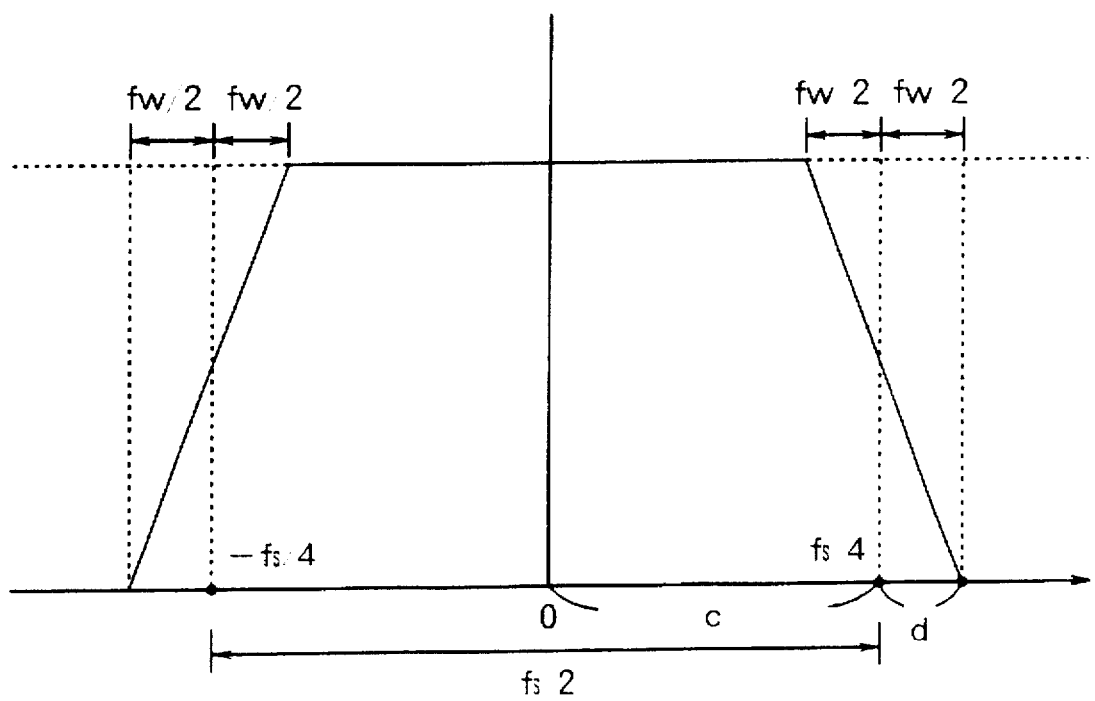
FIG. 6 is a view explaining the modulation method in the modulation circuit.

FIG. 4 is a view explaining the CP-1205 standard of the Electronic Industries Association of Japan used when optically transmitting an audio signal etc. FIG. 5 and FIG. 6 are views explaining the modulation method in the modulation circuit 230.

As shown in FIG. 4, the digital audio signal contained in the modulated signal is transmitted by utilizing the band of 3 MHz to 6 MHz in the high quality audio transmission band. Further, the continuous signal generated by repeating the control signal for controlling the processing of the digital audio signal a predetermined number of times is transmitted by utilizing the band of 0.33 to 0.4 MHz. For instance, the band H1 and H2 with 2.3 MHz and 2.8 MHz of the high quality audio transmission band as the center are used as the bands for the transmission of the analog audio signal.

FIG. 5 shows an example of the configuration of the modulation circuit 230. The transmission data, that is, the serial data from the multiplexing circuit 226, is supplied to a serial/parallel conversion circuit 2301 and converted to parallel data of 2-bit units, that is, either of (0, 0), (0, 1), (1, 0), and (1, 1). The I data, which is the most significant bit (MSB) of the symbol, and the Q data, which is the least significant bit (LSB), is supplied to the differential conversion circuit 2302.

In the differential conversion circuit 2302, the I and Q data are subjected to differential coding, and the differential I and Q data obtained as a result of this are output. Namely, if the symbol which is a set of I and Q data is expressed as (I, Q), corresponding to the now supplied symbol (0, 0), (0, 1), (1, 1) or (1, 0), an information point of the differential I and Q data obtained the previous time is rotated exactly by 0, π/2, or 3π/2, and I or Q data corresponding to the information point after the rotation is output as the differential I or Q data, respectively.

Accordingly, the phase of the modulated signal generated by an adder 2309 mentioned later will be rotated exactly by 0, π/2, π, or 3π/2 when the symbol is (0, 0), (0, 1), (1, 1), or (1, 0). When demodulating such a modulated signal, it is sufficient so far as only the amount of change of phase of the modulated signal is found. It is not necessary to detect the phase of a decoding carrier generated by an oscillator 2307 mentioned later. Accordingly, so-called phase uncertainty can be prevented.

The differential I or Q data output from the differential conversion circuit 2302 is filtered by a roll-off filter 2303 or 2304 comprised of a low pass filter etc. and output to a multiplier 2305 or 2306, respectively. A detailed description of this roll-off filter will be made later.

The multiplier 2305 is supplied with a sub-carrier from the oscillator 2307 in addition to the differential I data. Here, the oscillator 2307 generates a cosine wave having a frequency of for example 4.5 MHz and supplies this as the sub-carrier to the multiplier 2307 and a phase shifter 2308. Note that, the frequency of the sub-carrier was set to 4.5 MHz because, in the present embodiment, a frequency band of 3 MHz through 6 MHz is used, so 4.5 MHz (=(3 MHz+6 MHz)/2) which is the center frequency thereof is used so that the transmission band thereof can be effectively utilized.

As mentioned above, to put the digital audio signal within the band of 3 MHz (3 to 6 MHz), a differential type QPSK modulation (DQPSK modulation) method having a roll-off ratio of 50% or less is used. The multiplexed signal is modulated to generate a modulated signal having a frequency within a band of 3 MHz. Where the data transmission speed is fs (bps), since the width fW is generated in the filter as shown in FIG. 6 due to the band restriction, the used band width fn and roll-off ratio are found as shown in the following equations:

$$\begin{aligned}
\text{Roll-off ratio }(b) &= d/c \\
&= (fW/2)/(fs/4) \\
&= 2fW/fs \\
\text{Usage frequency band }(fn) &= fs/4 + fs/4 + fW/2 + fW/2 \\
&= fs/2 + fW
\end{aligned}$$

Note, in the DQPSK modulation method of the modulation circuit 230 (FIG. 3), the 2 bits of data of NRZ constitute one set, the pulse interval of NRZ is 2×T (microsecond), and the frequency band of the pulse of data is fs/2 (MHz).

Accordingly, where the maximum data speed is 4 Mbps, because of the conditions that the frequency band (fs) of the pulse of the data is 4 MHz, fW is b×fs/2, and the usage frequency band fn is 3 MHz, to suppress the data transmission speed of 4 MHz at the maximum to the usage frequency band 3 MHz, it is required that the roll-off ratio b become 50% or less.

Referring to FIG. 5 again, the modulation circuit 230 will be explained.

The multiplier 2305 multiplies the sub-carrier from the oscillator 28 and the differential I data and supplies the resultant data to the adder 2309.

On the other hand, the multiplier 2306 is supplied, other than the differential Q data, with the sub-carrier from the oscillator 2307 via the phase shifter 2308. The phase shifter 2308 rotates the phase of the sub-carrier from the oscillator 2307 exactly by π/2 and outputs the same. Accordingly, the multiplier 2306 is supplied with a sub-carrier having a phase different from that in the case in the multiplier 2305 exactly by π/2. The multiplier 2306 multiplies such a sub-carrier with the differential Q data and outputs the resultant data to the adder 2309. The adder 2309 adds the outputs of the multiplier 2305 and 2306, whereby an RF signal is generated as a modulated signal obtained by performing the QPSK modulation for the sub-carrier based on the differential I and Q data.

Figure 7:
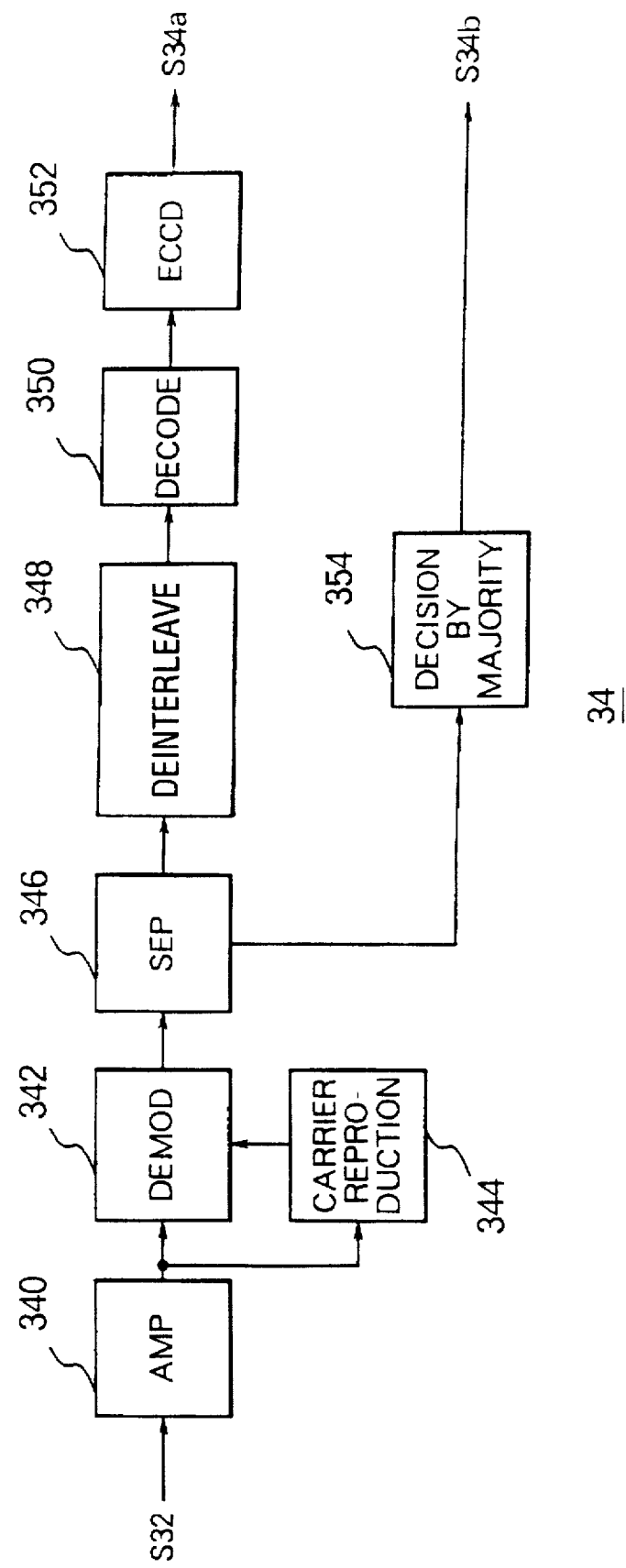
FIG. 7 is a view of the configuration of a reception circuit shown in FIG. 1.

FIG. 7 is a view of the configuration of the reception circuit 34 shown in FIG. 1. The reception circuit 34 is constituted by an amplification circuit 340, a demodulation circuit 342, a carrier reproduction circuit 344, a separation circuit 346, a deinterleave circuit 348, a decoding circuit 350, an error correction circuit (ECCD) 352, and a majority decision circuit 354. In practice, as shown in FIG. 2, one each is used for each of the speaker systems 42a and 42b. These reproduce the original digital audio signal from the reception signal S32 input from the photodiode 32 and output the same to the speaker systems 42a and 42b.

The amplification circuit 340 amplifies the reception signal S32 and outputs the result to the demodulation circuit 342 and the carrier reproduction circuit 344.

The carrier reproduction circuit 344 is constituted by a PLL circuit etc., reproduces the carrier from the reception signal, and outputs the same to the demodulation circuit 342 etc.

The demodulation circuit 342 performs the demodulation with respect to the reception signal by using the carrier reproduced by the carrier reproduction circuit 344 by a method corresponding to the modulation circuit 230 (FIG. 3) to reproduce the multiplexed signal and outputs the same to the separation circuit 346.

The separation circuit 346 separates the audio transmission signal and continuous signal from the multiplexed signal and outputs them to the deinterleave circuit 348 and the majority decision circuit 354, respectively.

The deinterleave circuit 348 deinterleaves the audio transmission signal and outputs the same to the decoding circuit 350.

The decoding circuit 350 decodes the signal input from the deinterleave circuit 348 by a method corresponding to the coding circuit 222 (FIG. 3) and outputs the same to the error correction circuit 352.

The error correction circuit 352 performs error correction by using the error correction code added by the error correction code addition circuit 220 (FIG. 3) and outputs the same as the digital audio signal S34a to the speaker systems 42a and 42b.

The majority decision circuit 354 judges the continuous signal by majority decision and outputs to the speaker systems 42a and 42b the signal coinciding at least five times among the control signals repeated eight times as the control signal 34b corresponding to the control signal S10b input from the digital audio equipment 10 to the transmitting apparatus 20. The control signal S10b can secure a sufficient reliability by the error correction by majority decision since the control signal S10b has a signal speed of several hundreds bps or less.

Figure 8:
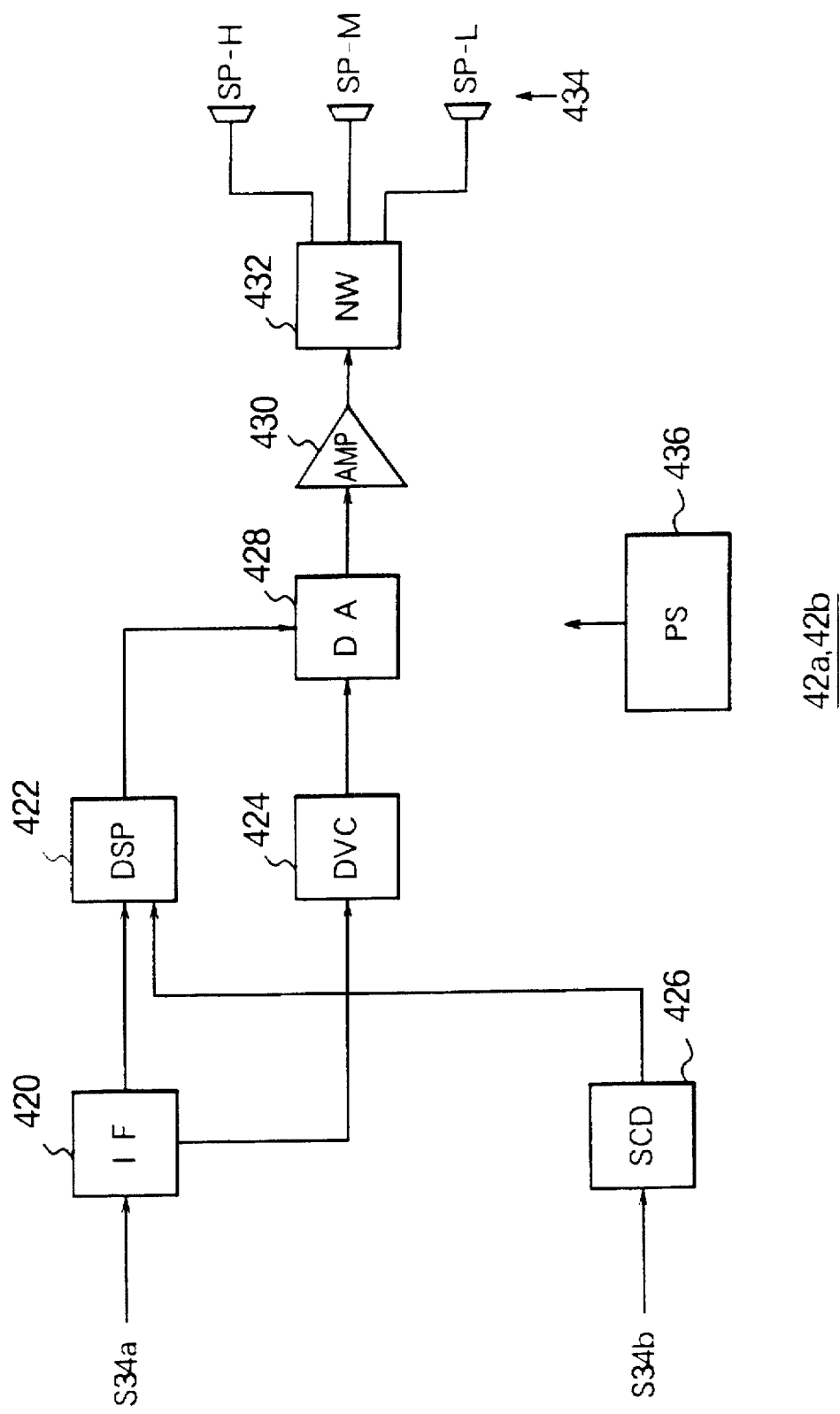
FIG. 8 is a view of the configuration of a speaker system shown in FIG. 1.

FIG. 8 is a view of the configuration of the speaker systems 42a and 42b shown in FIG. 1.

The speaker systems 42a and 42b are each constituted by an interface circuit 420, an audio processing circuit (DSP) 422, a volume control circuit (DVC) 424, a control signal decoder (SCD) 426, a digital/analog conversion circuit (D/A conversion circuit) 428, a power amplification circuit (AMP) 430, a network circuit (NW) 432, a speaker 434, and a power source circuit (PS) 436. In practice, as shown in FIG. 2, the two speaker systems are used for the left and right stereo sound. They adjust the sound volume and quality with respect to the digital audio signal by using the digital audio signal S34a and the control signal S34b input from the receiving apparatus 30 so as to reproduce an analog audio signal and output the result.

The interface circuit 420 extracts only the signal to be reproduced by its speaker system from the two left and right audio signals from the digital audio signal S34a. For example, the interface circuit 420 of the speaker system 42a extracts the right side audio signal, and the interface circuit 420 of the speaker system 42b extracts the left side audio signal. It outputs the signal to the audio processing circuit 422, extracts the control signal concerning the volume control, and outputs the same to the volume control circuit 424.

The control signal decoder 426 decodes the control signal S34b and outputs the result to the network circuit 432.

The audio processing circuit 422 adjusts the quality of the digital audio signal input from the interface circuit 420 based on the signal concerning the quality adjustment input from the control signal decoder 426 and outputs the result to the D/A conversion circuit 428.

The volume control circuit 424 adjusts the volume by changing the amplitude of the output signal of the D/A conversion circuit 428 based on the control signal input from the interface circuit 420.

The D/A conversion circuit 428 converts the digital audio signal which has been already adjusted in quality, input from the audio processing circuit 422 according to the control of the volume control circuit 424, to an audio signal of the analog format and outputs the result to the power amplification circuit 430.

The power amplification circuit 430 amplifies the power of the analog audio signal input from the D/A conversion circuit 428 and outputs the result to the network circuit 432. The network circuit 432 divides the signal amplified in the power amplification circuit 430 to signals of three bands of a high region, middle region, and low region by predetermined frequencies and outputs these signals via the "tweeter" high-range speaker (SP-H), "squawker" mid-range speaker (SP-M), and "woofer" low-range speaker (SP-L) of the speaker 434, respectively.

Below, the operation of the audio signal transmitting and receiving system 1 will be explained.

Refer to FIG. 1 again. The user of the digital audio equipment 10 plays back a compact disc in for example the digital audio equipment 10 and, at the same time, operates the digital audio equipment 10 to adjust the volume and quality.

The digital audio signal reproduced from the digital audio equipment 10 and the control signal corresponding to the operation of the user of the digital audio equipment 10 are output to the transmitting apparatus 20 as the digital audio signal S10a and the control signal S10b, respectively.

The transmitting apparatus 20 multiplexes the audio transmission signal generated from the input digital audio signal S10a and the continuous signal generated from the control signal S10b, modulates the result to generate a modulated signal, and spatially transmits the modulated signal as the optical transmission signal S24 to the receiving apparatus 30 corresponding to the speaker systems 42a and 42b.

The transmission signal S24 is received by the receiving apparatus 30, where a digital audio signal S34a and control signal S34b respectively corresponding to the digital audio signal S10a and the control signal S10b are reproduced and output to the speaker systems 42a and 42b. The speaker systems 42a and 42b perform the quality adjustment, sound volume adjustment, etc. with respect to the digital audio signal by digital processing by using the digital audio signal S34a and the control signal S34b and output the result from the speakers 42a, 42b.

By constituting the audio signal transmitting and receiving system in this way, the speaker cables between the digital audio equipment 10 and the speaker systems 42a and 42b become unnecessary, so arranging the digital audio equipment 10 and the speaker systems 42a and 42b becomes easy and the degree of freedom of arrangement in the room is increased.

Further, since the digital audio signal and the control signal can be multiplexed and transmitted, it becomes possible to process these signals by the same apparatus.

Further, since the audio signal is transmitted in the digital format, deterioration of the quality of sound as in the case where the audio signal of the analog format is transmitted hardly occurs.

Note that, the transmitting apparatus 20 and the receiving apparatus 30 of the audio signal transmitting and receiving system can be used for data transmission between for example a personal computer and a printer. That is, the data transmitted between the transmitting apparatus 20 and the receiving apparatus 30 is not restricted to a digital audio signal and control signal.

Further, the control signal transmitted between the transmitting apparatus 20 and the receiving apparatus 30 is not restricted to one for quality adjustment and volume adjustment and can be a control signal used for the switching of for example equipment too.

Further, it is also possible to provide a power amplification circuit 430 (FIG. 8) for each speaker of the speaker 434 and constitute the audio processing circuit 422 so as to divide the signal into a high band signal, middle band signal, and low band signal and correct the frequency characteristic and phase of each of these speakers.

In addition to the above embodiments, as shown in for example the modifications mentioned here, the audio signal transmitting apparatus, audio signal receiving apparatus, and audio signal transmitting and receiving system according to the present invention can adopt various configurations.

Figure 9:
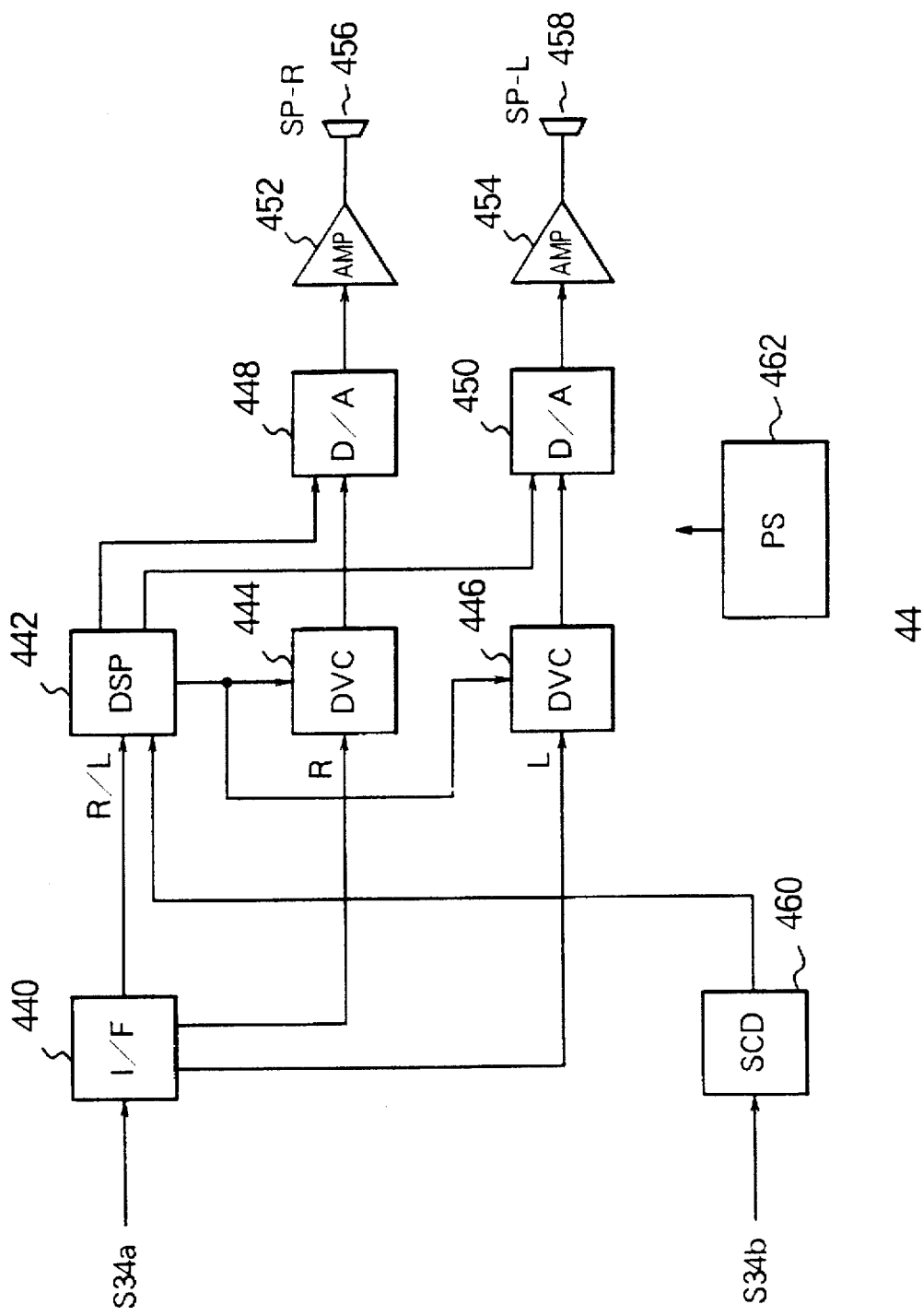
FIG. 9 is a view of the configuration of a headphone system.

FIG. 9 is a view of the configuration of a headphone system (HP) 44.

The headphone system 44 is connected to the receiving apparatus 30 in place of the speaker systems 42a and 42b as indicated by a dotted line in FIG. 1 and outputs the sound from the headphones.

The headphone system 44 has a configuration resembling the speaker systems 42a and 42b and is constituted by an interface circuit 440, an audio processing circuit 442, volume control circuits 444 and 446, a control signal decoder 460, D/A conversion circuits 448 and 450, power amplification circuits 452 and 454, left and right speakers 456 and 458 of the headphone, and power source circuit 462. It performs the volume adjustment and the quality adjustment with respect to the digital audio signal by using the digital audio signal S34a and control signal S34b input from the receiving apparatus 30, reproduces the analog audio signal, and outputs the same.

The interface circuit 440 receives the digital audio signal S34a, outputs this to the audio processing circuit 442, extracts the control signal concerning the volume control, and outputs the same to the volume control circuits 444 and 446.

The control signal decoder 460 decodes the control signal S34b and outputs the result to the audio processing circuit 442.

The audio processing circuit 442 adjusts the quality of the digital audio signal input from the interface circuit 440 based on the signal concerning the quality adjustment input from the control signal decoder 460 and outputs the left and right (R and L) digital audio signals to the D/A conversion circuits 448 and 450, respectively.

The volume control circuit 444 adjusts the volume by changing the amplitude of the output signals of the D/A conversion circuits 448 and 450 based on the control signal input from the interface circuit 440, respectively.

The D/A conversion circuits 448 and 450 convert the left and right digital audio signals which have been already adjusted in quality, input from the audio processing circuit 442, to audio signals of the analog format under the control of the volume control circuits 444 and 446, respectively, and output the results to the power amplification circuits 452 and 454.

The power amplification circuits 452 and 454 amplify the power of the analog audio signals input from the D/A conversion circuits 448 and 450 and output the result to the left and right speakers (SP-R, SP-L) 456 and 458.

The speakers 456 and 458 output the left and right analog audio signals, respectively.

Using the constituent elements mentioned above, the headphone system 44 performs the quality adjustment, the volume adjustment, etc. with respect to the digital audio signal by digital processing by using the digital audio signal S34a and the control signal S34b and outputs the results from the speakers 456 and 458. Where the headphone system 44 is used, unlike a case where the speaker systems 42a and 42b shown in the first embodiment are used, one receiving apparatus 30 is sufficient. An audio signal transmitting and receiving system using the headphone system 44 is preferred for the transmission, reproduction, etc. of a digital audio signal between a portable digital audio unit using for example a mini disc (MD) and headphones.

As mentioned above, using the audio signal transmitting apparatus, audio signal receiving apparatus, and audio signal transmitting and receiving system according to the present invention, an audio signal of a digital format having a small deterioration of quality of sound over the transmission path can be optically transmitted.

Further, using the audio signal transmitting apparatus, audio signal receiving apparatus, and audio signal transmitting and receiving system according to the present invention, the audio signal and the control signal used for the sound quality control thereof etc. can be transmitted carried in the same transmission signal.

What is claim is:

1. An audio signal transmitting apparatus comprising:
   an audio transmission signal generating means for adding an error correction signal to a digital audio signal and encoding and interleaving the result to generate an audio transmission signal;
   a continuous signal generating means which generates a continuous signal by repeating a predetermined number of times a digital control signal to be used for the reproduction of the digital audio transmission signal;
   a multiplexing means for multiplexing the audio transmission signal and the continuous signal to generate a multiplexed signal;
   a modulated signal generating means for modulating the multiplexed signal by a predetermined digital modulation method to generate a modulated signal within a predetermined frequency band; and
   an optical signal transmitting means for converting the modulated signal to an optical transmission signal and transmitting the same.

2. An audio signal transmitting apparatus according to claim 1, wherein
   said modulated signal generating means modulates said multiplexed signal by a differential type QPSK modulation method having a roll-off ratio of 50% or less to generate said modulated signal.

3. An audio signal transmitting apparatus according to claim 1, wherein
   said predetermined frequency band is within a range of from 3 MHz through 6 MHz.

4. An audio signal receiving apparatus for reproducing a digital audio signal from an optical transmission signal including a digital audio signal, comprising
   a reception means for converting the optical transmission signal to an electric reception signal;
   a multiplexed signal reproducing means for demodulating the reception signal by a digital demodulation method corresponding to a predetermined digital modulation method to reproduce a multiplexed signal;
   a separating means for separating an audio transmission signal and a continuous signal from the multiplexed signal;
   a digital audio signal reproducing means for deinterleaving the audio transmission signal separated by the separating means to produce a deinterleaved audio transmission signal, decoding the deinterleaved audio transmission signal to produce a decoded signal, and error correcting the decoded signal using an added error correction signal to reproduce the digital audio signal, and
   a digital control signal reproducing means for detecting the continuous signal by a majority decision to reproduce a digital control signal.

5. An audio signal receiving apparatus according to claim 4, wherein
   the frequency band of said electric reception signal is within a range of from 3 MHz through 6 MHz.

6. An audio signal receiving apparatus according to claim 4, further comprising
   a signal processing means for performing predetermined signal processing with respect to said digital audio signal based on said reproduced digital control signal.

7. An audio signal receiving apparatus according to claim 4, wherein
   said digital audio signal contains two channels of audio signals and
   said apparatus further comprises a signal output means for separating the two channels of audio signals from said digital audio signal and outputs either or both of these two channels of audio signals.

8. An audio signal transmitting and receiving system comprising an audio signal transmitting apparatus and an audio signal receiving apparatus,
   said audio signal transmitting apparatus comprising:
   an audio transmission signal generating means for adding an error correction signal to a digital audio signal and encoding and interleaving the result to generate an audio transmission signal;
   a continuous signal generating means which generates a continuous signal by repeating a predetermined number of times a digital control signal to be used for the reproduction of the digital audio transmission signal;
   a multiplexing means for multiplexing the audio transmission signal and the continuous signal to generate a multiplexed signal;
   a modulated signal generating means for modulating the multiplexed signal by a predetermined digital modulation method to generate a modulated signal within a predetermined frequency band; and an optical signal transmitting means for converting the modulated signal to an optical transmission signal and transmitting the same; and a reception means for converting the optical transmission signal to an electric reception signal;

a multiplexed signal reproducing means for demodulating the reception signal by a digital demodulation method corresponding to a predetermined digital modulation method to reproduce a multiplexed signal;

a separating means for separating an audio transmission signal and a continuous signal from the multiplexed signal;

a digital audio signal reproducing means for deinterleaving the audio transmission signal separated by the separating means to produce a deinterleaved audio transmission signal, decoding the deinterleaved audio transmission signal to produce a decoded signal, and error correcting the decoded signal using an added error correction signal to reproduce the digital audio signal, and a digital control signal reproducing means for detecting the continuous signal by a majority decision to reproduce a digital control signal.

9. An audio signal transmitting and receiving system according to claim 8, wherein said modulated signal generating means modulates said multiplexed signal by a differential type QPSK modulation method having a roll-off ratio of 50% or less to generate said modulated signal.

10. An audio signal transmitting and receiving system according to claim 8, wherein said predetermined frequency band is within a range of from 3 MHz through 6 MHz.

11. An audio signal transmitting and receiving system according to claim 8, wherein said audio signal receiving apparatus further comprises a signal processing means for performing predetermined signal processing with respect to said digital audio signal based on said reproduced digital control signal.

12. An audio signal transmitting and receiving system according to claim 8, wherein said digital audio signal contains two channels of audio signals and said audio signal receiving apparatus further comprises a signal output means for separating the two channels of audio signals from said digital audio signal and outputs either or both of these two channels of audio signals.

* * * * *